July 19, 1927.
T. T. READ
CLOSURE
Filed April 24, 1924
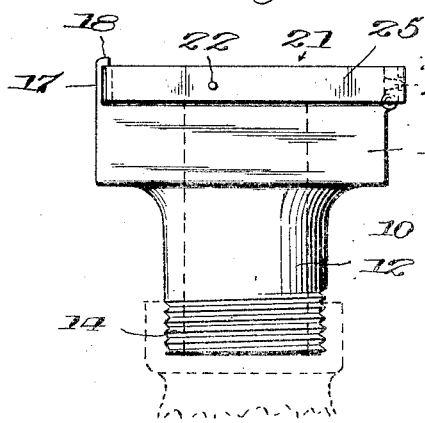
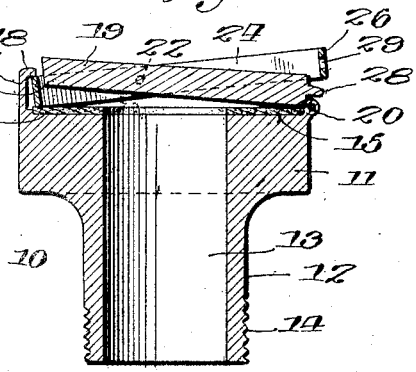
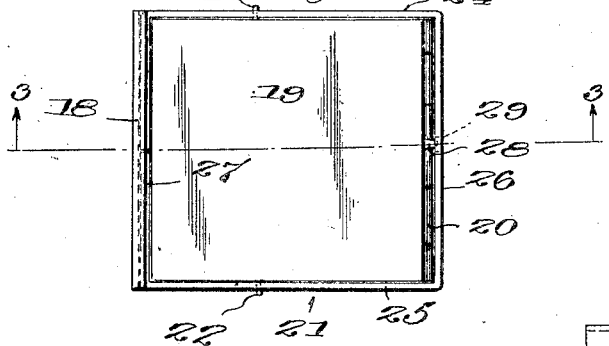
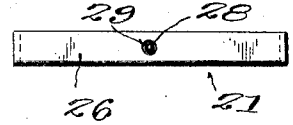
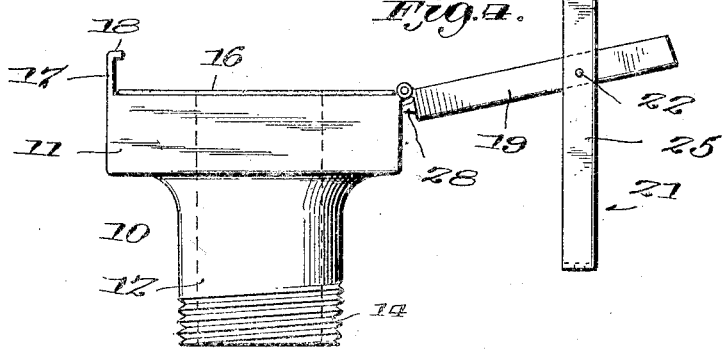
Inventor
Thomas T. Read,
By Steward & McKay
his Attorneys Patented July 19, 1927.

1,636,487

UNITED STATES PATENT OFFICE.

THOMAS T. READ, OF WASHINGTON, DISTRICT OF COLUMBIA.

CLOSURE.

Application filed April 24, 1924. Serial No. 708,751.

This invention relates generally to closures.

An object of this invention is to provide a closure that can be easily and quickly opened and closed.

Another object of the invention is to provide means cooperating with the closure operable to force the closure into leak-proof engagement with the receptacle or casing supporting the closure, said means clamping and holding the closure in this position.

Other objects and advantages will be apparent from the following description.

A closure such as referred to above is capable of general and widespread use, but one particular use for which the invention is particularly well adapted is as a closure for the filling opening of an automobile radiator. The closure or cap of an automobile radiator should fit the filling opening tightly to prevent the escape of steam and boiling water from the radiator and at the same time the closure or cap should be easily and quickly moved to open or closed positions because the closure or cap is usually too hot to be touched or handled with comfort. The closure or cap should also be held in firm engagement with the radiator to prevent loss of the closure or cap, notwithstanding vibrations tending to loosen such engagement.

The present invention has all the desirable features just mentioned and is therefore particularly adapted for use as a closure for the filling opening of an automobile radiator. Accordingly, this particular use of the invention will be illustrated and described, but it is to be understood that the specific embodiment here chosen for purposes of illustration is merely typical of devices contemplated by the invention and included within the scope of the appended claims.

In the drawings, Fig. 1 is a side elevation of a device embodying the invention with the closure in closed position, the device being shown connected to an automobile radiator, a fragment of which is shown in dotted lines, Fig. 2 is a top plan view, Fig. 3 is a vertical sectional view taken on the line 3—3 of Fig. 2, Fig. 4 is a side view with the closure in open position, and Fig. 5 is an end view of the lever device showing it engaged with the latch.

Broadly stated, the invention comprises a casing or receptacle having an opening and provided with an abutment or shoulder, a closure member adapted to close said opening, and means connected to the closure member movable to engage said abutment as said closure member is closed and operable to move the closure member into and hold it in closed position, said means also operable to release the closure member, said means and closure member being in alinement when the closure member is closed and out of alinement when the closure member is open.

Stated more specifically, the invention comprises a casing or receptacle having an opening and provided with a shoulder or abutment, a closure member adapted to close said opening, a lever pivotally connected to said closure member and movable to engage said shoulder or abutment as said closure member is closed, said lever operable to move the closure member from a position out of alinement with said lever to a position in alinement with said lever, and a latch for holding said lever and closure member in alinement.

Referring to the drawings, 10 indicates generally a member which in the specific embodiment illustrated, is a casing, but it is to be understood that this term as used throughout the specification and claims broadly includes frames, tanks, containers, receptacles, and other similar or equivalent constructions in general as the invention can be used equally well with all these structures. In the present instance, the casing comprises a substantially square portion 11 and a round reduced portion 12. In the embodiment illustrated, the casing is provided with a hollow interior or opening 13 and is adapted to be screwed or otherwise secured in the filling opening of an automobile radiator, the reduced round end of the casing being provided with screw threads 14 to connect with complementary threads on the automobile radiator.

The square end of the casing member 10 is provided with a plane surface or seat 15 adapted to receive a gasket or washer 16. Projecting from the plane surface or seat 15 of the casing 10 is an abutment or shoulder 17, which in the present instance runs along one side or edge of the square portion 12 of the casing 10 and has an overhanging end portion 18.

A closure member 19 is pivotally connected by the hinge 20 to the casing member 10, the hinge 20 extending along the edge or side of the square portion of the casing opposite to the abutment 17 so that the closure member swings toward and away from the abutment or shoulder. Closure member 19 is adapted to close the opening 13 and in closed position, the closure member engages the gasket 16 supported on the plane surface or seat 15 surrounding the opening 13 of the casing member 10.

Means have been provided for opening and closing the closure member, said means holding and locking the closure member in closed position. In the present instance, said means comprises a lever device 21 pivotally connected at the points 22 and 23 to the closure member 19, pivots 22 and 23 being in alinement with each other. The exact shape and construction of the lever device 21 can differ widely within the scope of the broad invention, but I prefer the construction illustrated in the drawings. Referring to Fig. 2, it will be observed that the lever device 21 comprises lever arms 24 and 25 and ends or arms 26 and 27 which connect or are attached to the ends of the lever arms 24 and 25. I prefer to make the lever device of resilient or spring metal and as seen in Fig. 2, the lever device is made of one piece of metal, bent to form a hollow square, the lever device encircling and corresponding substantially to the shape of the closure member. The pivots 22 and 23 are located on opposite sides, respectively, of the closure member intermediate the pivoted and the free or swinging ends thereof. Pivots 22 and 23 are located closer to the swinging edge of the closure member than the pivoted edge so that the power arm of the lever is longer than the weight arm. The lever device 21 is adapted to engage the abutment 17 as said closure member is moved to closed position. Fig. 3 shows the position the parts take just before the closure member is entirely closed. In this position, the end 27 of the lever device engages the plane surface or seat 15 of the casing member, end 27 also engaging or extending under the overhanging end 18 of the shoulder 17 and closure member 19 engages and slightly compresses part of the gasket 16 on the plane surface 15 of the casing so that there is a slight binding or tensioning of the parts and the closure member can be moved into full seating engagement with the gasket 16 only with an effort. In this position of the parts, end 26 of the lever device 21 is above or away from the pivoted end of the closure member 19. In order to entirely close the closure member 19, the end 26 of lever device 21 is pushed downwardly or toward the closure member and this movement is continued until the closure member and the lever device are in alinement with each other, the lever device forcing and holding the closure member in firm engagement with the gasket 16 carried by the plane surface or seat 15 of the casing member, the parts assuming the position shown in Fig. 1. It will be seen that the closure member 19 and the lever device 21 comprises two members of a toggle joint so that when the lever device and closure member are in alinement, they will stay in this position because the pivot points are at dead center, but I have provided additional means for maintaining the lever device and closure member in alinement. In the present instance, such means comprises a rigid stud 28 carried by the pivoted edge of the closure member, said stud adapted to engage in an opening 29 provided in the arm 26 of the lever device, the stud engaging in the opening in the lever device when the lever device and closure member are in alinement, the lever device being made sufficiently resilient to yield and allow the stud to frictionally engage in the opening. Although the form of latch shown is preferred because of its simplicity, it is obvious that it is only one of many forms which can be used and which come within the scope of the broad invention.

In opening the closure member, it is only necessary to break the toggle joint and this is done by pulling upon and moving the end 26 of the lever device away from the closure member 19 and if the lever device is given a quick upward pull as viewed in the drawings, the closure device will fly open and assume the position shown in Fig. 4.

It will be noted that in view of the construction and arrangement of the parts just described that in both the opening and closing of the closure member the advantage of the comparatively long power arm (comprising the entire length of sides 24 or 25) of the lever device as compared to the short weight arm (the distance from the pivots 22 or 23 to the end 27 of the lever device) is gained and this same difference of leverage is used in holding the closure member in closed position. Thus the closure member can be easily and quickly opened and closed and when in closed position, the closure member compresses the gasket sufficiently to provide a leak-proof joint.

Although one construction embodying the invention has been shown and described in detail, it is to be understood that the invention is not limited to the specific construction herein illustrated and explained, but that various changes and modifications can be made without departing from the scope of the invention as defined in the appended claims. For instance, the closure member can be connected directly to the automobile radiator instead of being connected to an attachment adapted to be connected in the usual screw threaded filling opening of the ordinary automobile radiator.

What is claimed is:

1. In a device of the class described, the combination, with a casing having an opening and provided with an abutment, and a pivoted closure member adapted to close said opening, of means carried by the closure member movable to press against said abutment and to extend between said abutment and the swinging edge of said closure member, said means operable to move the closure member into and hold it in closed position.

2. A device of the class described comprising, the combination, with a casing having an opening and provided with an abutment, and a pivoted closure member adapted to close said opening, of means carried by the closure member movable to press against said abutment as said closure member is closed and to extend between said abutment and the swinging edge of said closure member, said means operable to move the closure member into and hold it in closed position, said means also operable to release and open said closure member.

3. A device of the class described, comprising, the combination, with a casing having an opening and provided with an abutment, and a closure member adapted to close said opening, of means connected to the closure member movable to engage said abutment as said closure member is closed and operable to move the closure member into and hold it in closed position, said means also operable to release the closure member, said means and closure member being in alinement when the closure member is closed and out of alinement when the closure member is open.

4. A device of the class described comprising, the combination, with a casing having an opening and provided with an abutment, and a closure member adapted to close said opening, of means connected to the closure member movable to engage said abutment as said closure member is closed and operable to move the closure member into and hold it in closed position, said means also operable to release the closure member, said means and closure member being in alinement when the closure member is closed and out of alinement when the closure member is open, and means for holding said means and said closure member in alinement.

5. A device of the class described comprising, in combination, a casing having an opening and provided with an abutment, and toggle members connected to said casing including a closure member adapted to close said opening and a lever member movable to engage said abutment as said closure member is closed, said lever member operable to move the closure member to closed position or to open the same, said toggle members being in alinement when the closure member is in closed position.

6. A device of the class described comprising, in combination, a casing having an opening and provided with an abutment, toggle members connected to said casing including a closure member adapted to close said opening and a lever member movable to engage said abutment as said closure member is closed, said lever member operable to move the closure member to closed position or to open the same, said toggle members being in alinement when the closure member is in closed position, and means for holding said toggle members in alinement.

7. A device of the class described comprising, the combination, with a casing having an opening and provided with an abutment, and a closure member adapted to close said opening, of a lever pivotally connected to said closure member and movable to engage said abutment as said closure member is closed, said lever operable to move the closure member from a position out of alinement with said lever to a position in alinement with said lever.

8. A device of the class described comprising, the combination, with a casing having an opening and provided with an abutment, and a closure member adapted to close said opening, of a lever pivotally connected to said closure member and movable to engage said abutment as said closure member is closed, said lever operable to move the closure member from a position out of alinement with said lever to a position in alinement with said lever, and a latch for holding said lever and closure member in alinement.

9. A device of the class described comprising, the combination, with a casing having an opening and provided with an abutment, and a closure member adapted to close said opening, of a lever device pivotally connected to said closure member, said lever device comprising two lever arms and a resilient arm connecting said lever arms, said lever device movable to engage said lever arms with said abutment as said closure member is closed and operable to close or open said closure member, and means carried by the closure member engaging the resilient arm of said lever device when the closure member is closed to hold said closure member in closed position.

10. A device of the class described comprising, the combination, with a casing having an opening and provided with an abutment, said casing having a plane surface providing a seat adjacent said opening, a gasket supported on said seat, and a closure member adapted to close said opening, of a lever pivotally connected to said closure member and movable to engage said abutment as said closure member is closed, said lever operable to force said closure member against said gasket and causing said closure member to slightly compress said gasket, and a latch engaging said lever and causing it to hold said closure member in engagement with said gasket.

11. A device of the class described comprising, the combination, with a casing having an opening and provided with an abutment, and a closure member pivotally connected to said casing and adapted to close said opening, of a lever device comprising an integral piece of resilient metal encircling and pivotally connected to said closure member, said lever device including lever arms and connecting arms, one of said connecting arms provided with an opening, said lever device movable to engage said lever arms and one of said connecting arms with said abutment as said closure member is closed and operable to close or open said closure member, and a stud carried by the closure member engaging in the opening in one of said connecting arms of said lever device when the closure member is closed to hold said closure member in closed position.

In testimony whereof I hereunto affix my signature.

THOMAS T. READ.